US012112393B2

(12) United States Patent
Subbarayan

(10) Patent No.: US 12,112,393 B2
(45) Date of Patent: Oct. 8, 2024

(54) APPARATUS, SYSTEMS, AND METHODS FOR REQUESTING TRANSPORTATION VIA A TRANSPORTATION KEY

(71) Applicant: Lyft, Inc., San Francisco, CA (US)

(72) Inventor: Anand Subbarayan, San Ramon, CA (US)

(73) Assignee: Lyft, Inc., San Francisco, CA (US)

( * ) Notice: Subject to any disclaimer, the term of this patent is extended or adjusted under 35 U.S.C. 154(b) by 987 days.

(21) Appl. No.: 16/578,163

(22) Filed: Sep. 20, 2019

(65) Prior Publication Data

US 2021/0090075 A1 Mar. 25, 2021

(51) Int. Cl.
  *G06Q 50/40* (2024.01)
  *G06Q 10/02* (2012.01)
  *G06Q 20/32* (2012.01)

(52) U.S. Cl.
  CPC ............ *G06Q 50/40* (2024.01); *G06Q 10/02* (2013.01); *G06Q 20/3278* (2013.01)

(58) Field of Classification Search
  CPC ..................................................... G06Q 50/40
  See application file for complete search history.

(56) References Cited

U.S. PATENT DOCUMENTS

| D622,674 S | * | 8/2010 | Maier | .......................... D13/168 |
| 2004/0232221 A1 | * | 11/2004 | Beenau | .................... G07C 9/29 |
| | | | | 235/380 |
| 2011/0246404 A1 | * | 10/2011 | Lehmann | ............... G06Q 50/14 |
| | | | | 706/21 |
| 2015/0160023 A1 | * | 6/2015 | Goel | .................... G08G 1/0129 |
| | | | | 701/400 |
| 2017/0046681 A1 | * | 2/2017 | Dixon | ................. G06Q 20/325 |

(Continued)

FOREIGN PATENT DOCUMENTS

| WO | WO-2010148506 A1 | * | 12/2010 | ............ B60L 11/007 |
| WO | WO-2011006138 A1 | * | 1/2011 | ............. G06Q 10/08 |

OTHER PUBLICATIONS

NYTimes.com; "Older People Need Rides. Why Aren't They Using Uber and Lyft?" available at: https://www.nytimes.com/2019/08/16/health/uber-lyft-elderly.html, acessed via webarchive screen grab of Aug. 19, 2019 (Year: 2019).*

*Primary Examiner* — Emmett K. Walsh
(74) *Attorney, Agent, or Firm* — Keller Preece PLLC

(57) ABSTRACT

The disclosed apparatus may include a hardware input and a display. In some embodiments, the disclosed apparatus may include a transportation key controller configured to initiate a transportation request with a dynamic transportation matching system, generate data on the display to indicate the transportation request has been initiated, and modify the data on the display to indicate one or more statuses associated with the transportation request. In some embodiments, the apparatus may enable a user to request transportation via a dynamic transportation matching system with a single button press. In some examples, the systems described herein may predict the user's destination based on context. In one embodiment, the apparatus may interface with one or more additional transportation networks, such as public transportation networks, for example by providing payment information. Various other methods, systems, and computer-readable media are also disclosed.

20 Claims, 12 Drawing Sheets

(56) References Cited

U.S. PATENT DOCUMENTS

| | | | |
|---|---|---|---|
| 2017/0193627 A1* | 7/2017 | Urmson | G06Q 10/06315 |
| 2019/0003844 A1* | 1/2019 | Marco | H04W 4/021 |
| 2019/0206258 A1* | 7/2019 | Chang | G06T 19/006 |
| 2020/0242945 A1* | 7/2020 | Beaurepaire | G08G 1/20 |
| 2021/0334710 A1* | 10/2021 | Guo | H04W 4/025 |

* cited by examiner

APPARATUS, SYSTEMS, AND METHODS FOR REQUESTING TRANSPORTATION VIA A TRANSPORTATION KEY

BACKGROUND

The modern world offers a stunning variety of methods of personal transportation. A person can own or lease a personal vehicle, use various ride-sharing services, take public transit, or use a combination of these options to reach their destination. In many cases, the processes for interacting with each of these forms of transportation differ. A person might use their phone to request a ride via a ride-sharing service, enter a code into a scooter or bicycle to unlock the scooter or bicycle for temporary use, buy a ticket to ride public transit, and/or use a transit card to access public transit. In some cases, it may become inconvenient for a person to mentally and physically keep track of all the different devices and processes necessary to access different forms of transit. Additionally, some ways of interacting with transit, such as completing a multi-step process to summon a ride-sharing vehicle or entering a code by hand to unlock a scooter, may be inconvenient. What is needed, therefore, is a more efficient and/or effective way to request transportation.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
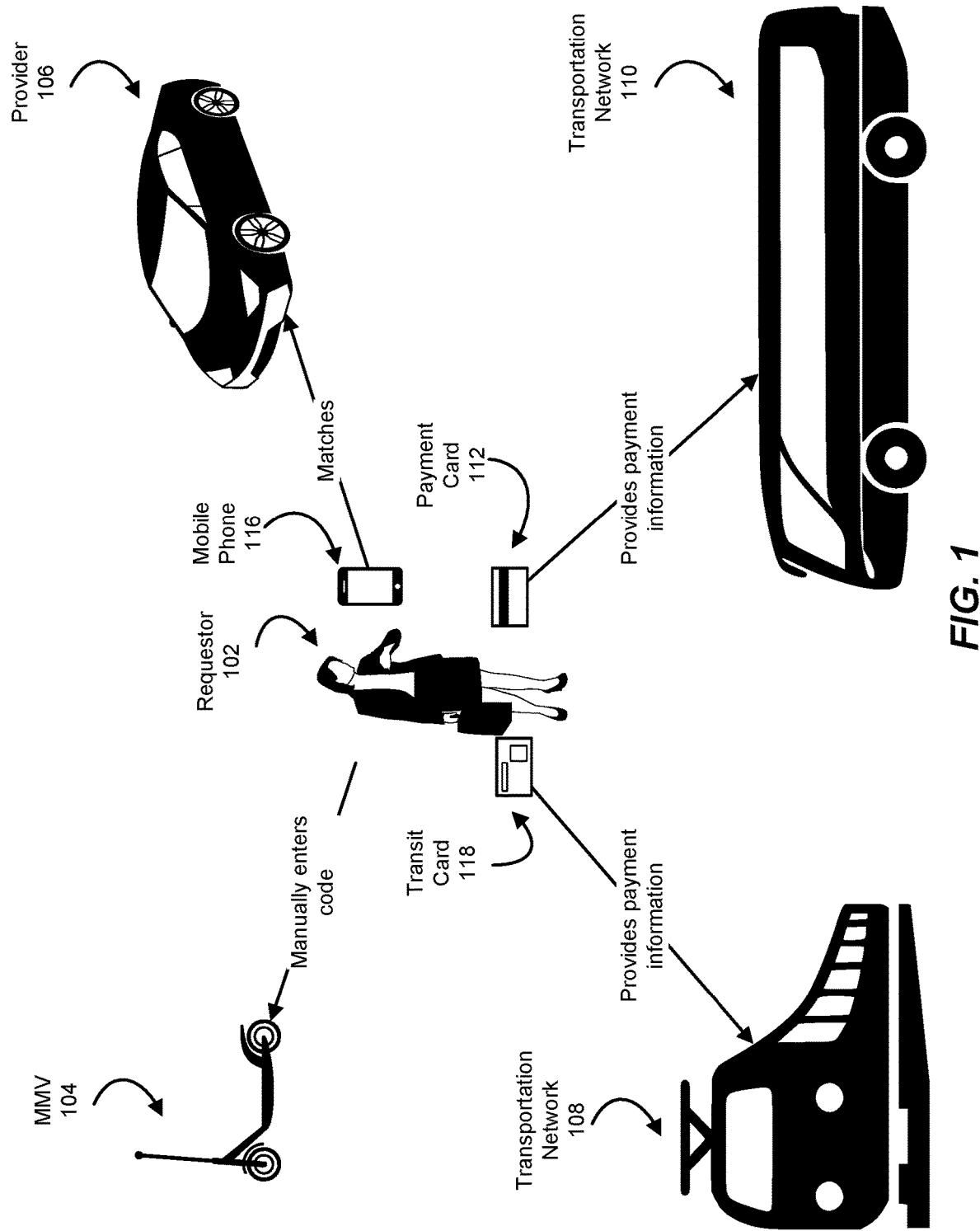
FIG. 1 is an illustration of an example transportation requestor with multiple objects and processes, each associated with a different mode of transportation.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to an apparatus that enables passengers to request transportation via a dynamic transportation network, unlock a personal mobility vehicle and/or micro-mobility vehicle associated with the dynamic transportation network, and/or access any other transit mode associated with the dynamic transportation network. In some embodiments, a universal transportation key may enable a transportation requestor to request transportation with a single click of a dedicated hardware input, such as a button. In some examples, the key may increase convenience by predicting the transportation requestor's desired destination with a high degree of success based on the transportation requestor's current location, the time of day, and/or other contextual clues and historical behavior.

A universal, dedicated transportation key may include a variety of components that help transportation requestors request and/or manage transportation. For example, a key may include a microphone that enables the transportation requestor to request a specific destination via voice commands, enabling the key to facilitate transportation to less predictable destinations. In some embodiments, the key may include a screen that displays status information about the request, such as estimated time of arrival (ETA), transportation provider license plate, and/or other relevant information in order to enable the transportation requestor to more easily and safely meet the transportation provider. In some examples, the key may also be used to unlock a personal mobility vehicle and/or micro-mobility vehicle, such as a scooter or bicycle, by being placed in physical contact with the personal mobility vehicle. Additionally or alternatively, the key may store payment information and may enable the transportation requestor to provide payment information to public transportation networks. Accordingly, as may be appreciated, the systems and methods described herein may provide advantages to the field of transportation by increasing the convenience and/or safety of interacting with multiple different transportation networks.

One or more of these advantages may be realized via a dynamic matching system that responds to requests from a dedicated key. Such a matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

A transportation network may leverage various sources of transportation to respond to a request made via a dedicated hardware key. In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include lane-bound vehicles (e.g., cars, light trucks, etc.) that are primarily intended for operation on roads. Furthermore, the dynamic transportation network may include personal mobility vehicles (also referred to as micro-mobility vehicles) that are not bound to traditional road lanes, such as scooters, bicycles, electric scooters, electric bicycles, and/or any other suitable type of personal mobility vehicle. In some embodiments, a dynamic transportation network may include autonomous vehicles (e.g., self-driving cars) that may be capable of operating with little or no input from a human operator.

FIG. 1 illustrates an example transportation requestor 102 with multiple objects and processes, each associated with a different mode of transportation. For example, transportation requestor 102 may manually enter a code to unlock a micro-mobility vehicle (MMV) 104, use a mobile phone 116 to request transit via a transportation provider 106 associated with a dynamic transportation network, use a transit card 118 (i.e., a designated card associated with the transportation network) to provide payment information to a transportation network 108, and/or use a payment card 112 (e.g., a credit card or debit card) to provide payment information to a transportation network 110.

In some examples, mobile phone 116 may be configured with a variety of applications that are each associated with a different dynamic transportation matching system, increasing user choice but in some cases decreasing convenience by overwhelming the user with too many choices. In some embodiments, transit applications on mobile phone 116 may require multiple steps to obtain transit.

The term "transportation network," in some examples, may generally refer to any collection of transportation resources that are coordinated and/or managed by a system that tracks the location of the transportation resources, sends instructions to the transportation resources directing the transportation resources to move to specified locations at specified times, and/or matches transportation requestors with transportation resources. Examples of transportation networks may include, without limitation, a dynamic transportation network, a public transportation network, a private transportation network, and/or any other collection of vehicles that provide transportation resources to transportation requestors and/or the dynamic transportation network. Examples of transportation resources may include, without limitation, automobiles, trains, and/or any other suitable type of vehicle.

Figure 2:
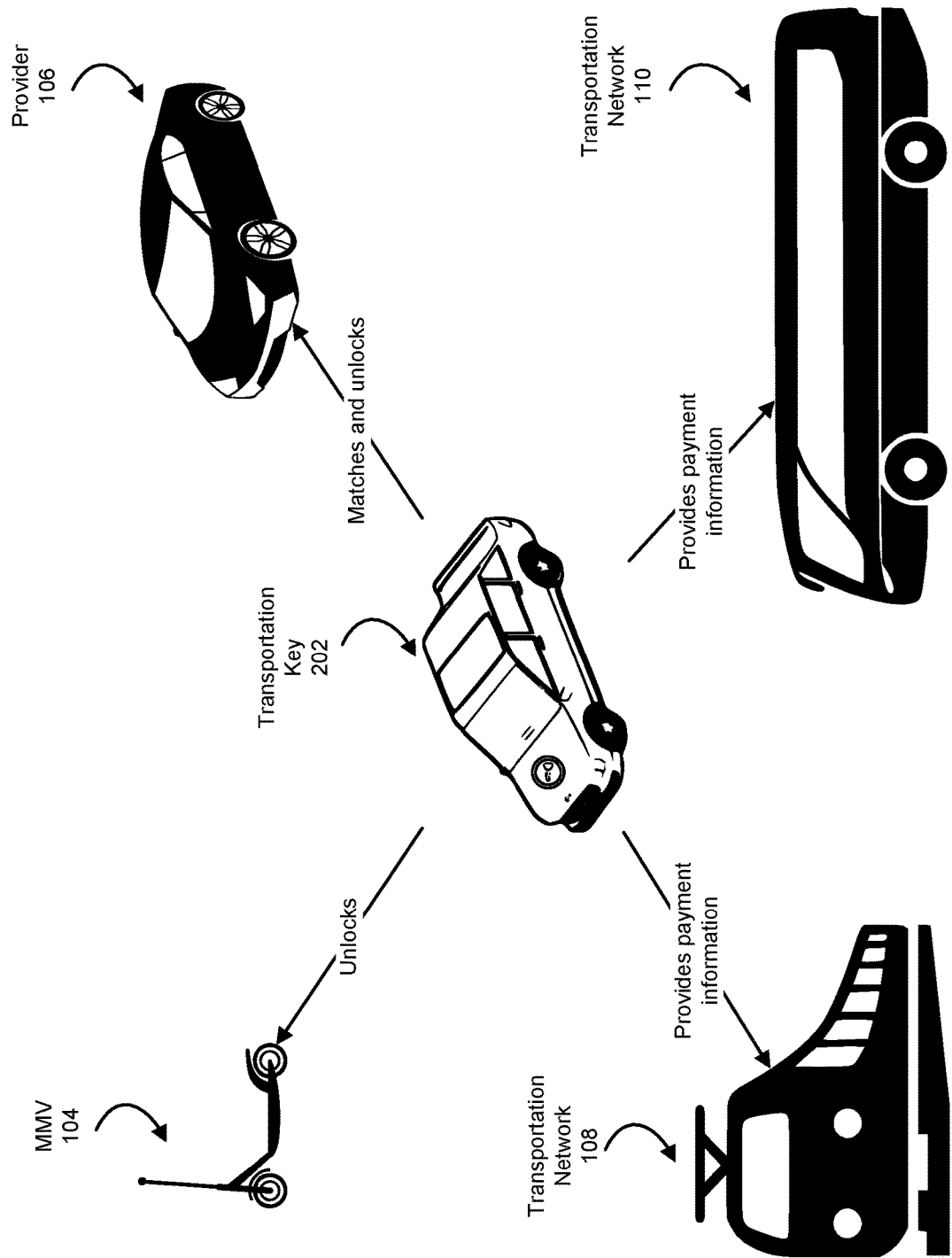
FIG. 2 is an illustration of a transportation key that enables a transportation requestor to conveniently obtain transit via multiple transportation networks.

FIG. 2 illustrates a transportation key 202 that enables a transportation requestor to conveniently obtain transit via multiple transportation networks. In one example, interacting with a dedicated hardware input (e.g., pressing a button) on transportation key 202 may enable a transportation requestor to request transportation via a dynamic transportation matching system and be matched with transportation provider 106. The term "dedicated," in some examples, may generally refer to any hardware component that performs a single task in response to a single type of input (e.g., a short press), as opposed to a general-purpose hardware component that may perform many different tasks in response to the same type of input. For example, a dedicated button for requesting transportation may always request transportation when pressed, as opposed to a general-purpose hardware input, such as a touchpad, that may perform many different functions when touched depending on the graphical user interface being interacted with. In some embodiments, a dedicated hardware input may be physically hard-wired to send a specified signal to an additional hardware component.

In some embodiments, the term "hardware input," as used herein, may refer to any physical component that is designed to receive input from a user. For example, a hardware input may receive physical input (e.g., a button press, a touch-screen swipe, a toggle, a dial turn), audio input, and/or visual input. Examples of hardware inputs may include, without limitation, buttons, toggles, switches, dials, wheels, touch-screens, microphones, and/or cameras.

In addition to enabling a user to request transportation, a transportation key may provide physical access to one or more modes of transportation. For example, transportation key 202 may be configured to unlock a transportation resource when transportation key 202 is in physical contact or physical proximity of the transportation resource. The term "physical proximity," in some examples, may generally refer to a predetermined distance, a radio signal or near-field communication (NFC) signal range, or any distance (e.g., within a few feet) between a transportation key and a receiver. In the example illustrated in FIG. 2, transportation key 202 may unlock MMV 104 when in physical proximity of MMV 104 (e.g., by using a near-field communication (NFC) protocol and/or a radio-frequency identification (RFID) chip). Transportation key 202 may also unlock or otherwise provide physical access to MMV 104 in any other suitable manner.

Transportation key 202 may unlock a transportation resource in response to a variety of triggers. For example, transportation key 202 may physically unlock a matched transportation provider 106 (e.g., by unlocking car door locks) when in proximity to transportation provider 106 (i.e., transportation provider 106 may be unlocked in response to detecting the physical proximity of transportation key 202). In this example, by physically unlocking transportation provider 106, transportation key 202 may increase the overall safety of a transportation match (for both transportation requestors and providers) by increasing the likelihood that the transportation provider operator is picking up the matched transportation requestor and not an imposter or non-matched requestor. In other examples, transportation provider 106 may be an autonomous vehicle and transportation key 202 may provide the transportation provider with access to the autonomous vehicle.

In some embodiments, transportation key 202 may also store payment information for, and/or provide payment information to, a transportation network associated with a transportation resource, such as MMV 104. For example, transportation key 202 may provide payment information to MMV 104 via NFC. In additional embodiments, transportation key 202 may include a payment information module that stores and/or provides (using, e.g., one or more communication protocols) payment information to transportation network 108 and/or 110. For example, transportation key 202 may store information for payment card 112 and/or transit card 118, enabling the transportation requestor to interact with the relevant transportation networks without carrying and/or presenting payment card 112 and/or transit card 118.

Figure 3:
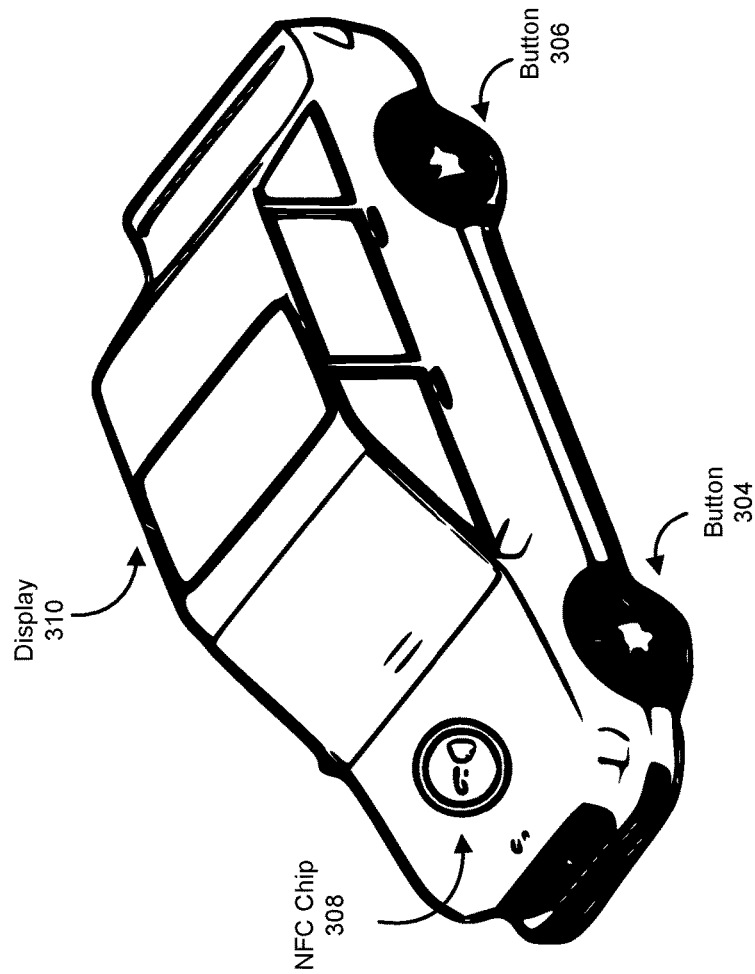
FIG. 3 is an illustration of an example transportation key with a form factor resembling an automobile.
Figure 4:
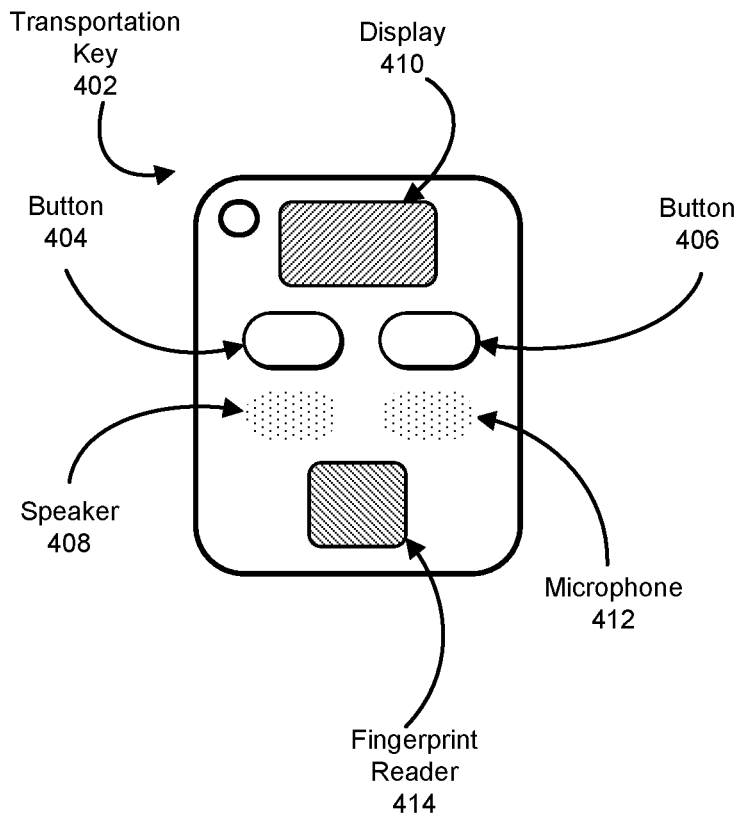
FIG. 4 is an illustration of an example transportation key with a form factor resembling a keyfob.

In addition to providing various functions, the transportations keys discussed herein may be implemented in various form factors. For example, FIG. 3 illustrates a transportation key 302 in a handheld or form factor that resembles an automobile, while FIG. 4 illustrates transportation key 402 with the form factor of a keyfob. In some embodiments, a transportation key may be configured as a keyfob in a form factor of a vehicle. A transportation key may also be configured using any other suitable form factor. For example, a transportation key may have the form factor of a bracelet, pendant, and/or other wearable device. In some embodiments, a transportation key may be dimensioned to be smaller than a typical mobile phone. For example, a transportation key may be dimensioned such that the largest dimension is less than five inches, less than four inches, or less than three inches. In one example, a transportation key may be dimensioned to fit within the palm of a transportation requestor's hand or to attach to a user's keyring (e.g., a transportation key may have one or more dimensions that are similar in size to a traditional automobile or house key). In some embodiments, a transportation key may be dimensioned to resemble and/or have similar dimensions to a common type of keyfob, such as an automobile keyfob and/or a garage door opener.

Transportation keys may include one or more of various types of hardware inputs. In the example shown in FIG. 3, transportation key 302 may have one or more hardware inputs, such as a button integrated into each wheel. One or more of these buttons may enable a transportation requestor to request transportation. For example, by pressing button 304, a transportation requestor may request transportation from a transportation provider.

The above-described hardware inputs may perform a variety of different actions or sequence of actions. In some embodiments, pressing button 304 may cause transportation key 302 to query a dynamic transportation network to predict the likely destination of the transportation request. In another embodiment, pressing button 304 may cause transportation key 302 to initiate a transportation request to a specific predefined location, such as a transportation requestor's home.

Additionally or alternatively, when transportation key 302 detects that button 304 has been pressed, transportation key 302 may activate an audio receiver in order to capture or receive verbal information about the destination of the transportation request. In some embodiments, the audio receiver may only be active (i.e., may only receive and/or record audio) after the transportation requestor has performed an action that activates the audio receiver (e.g., by pressing button 304) and may not be active at other times. The term "audio receiver," in some examples, may generally refer to any component capable of detecting and/or recording audio information. In some embodiments, an audio receiver may include a microphone, an audio transducer, and/or a software and/or firmware controller that processes and/or records audio.

In some embodiments, the transportation keys described herein may be configured to perform different actions when multiple buttons are simultaneously pressed, when certain buttons are pressed in sequence, or the like. For example, when transportation key 302 detects that both button 304 and button 306 have been pressed simultaneously (e.g., within the same second), transportation key 302 may perform an additional function, such as initiating a message to the dynamic transportation matching system that cancels a transportation request initiated by transportation key 302. In some embodiments, button 306 may be a dedicated hardware input that initiates a message to the dynamic transportation matching system that cancels the transportation request. Button 306 may also cause transportation key 302 to perform any of the previously described functions associated with button 304. In one embodiment, button 304 and/or 306 may function as a panic button, alerting the authorities and/or sharing the user's location with the authorities in response to a specific type of interaction (e.g., a long press).

In some embodiments, transportation key 302 may include a display 310. In some examples, transportation key 302 may generate and/or modify a variety of different forms of data for display 310, including one or more statuses associated with the transportation request, such as transportation provider ETA information and/or an identifier or a description of the transportation provider (e.g., vehicle make, model, and/or color, license plate, and/or other identifiers) that was matched with transportation key 302 by the dynamic transportation matching system. In one embodiment, display 310 may include one or more light-emitting diodes (LEDs) that change color to match the color of a light placed visibly (e.g., in the windshield) of the transportation provider that matched to transportation key 302. Additionally or alternatively, the LEDs may be separate from display 310. In some embodiments, transportation key 302 may be ringed with LEDs that may light up to guide a transportation requestor to meet a provider, such as by showing a specific color in the direction that the transportation provider should travel to meet the transportation provider while showing a different color or no color in the other LEDs. In some embodiments, display 310 may include a liquid crystal display, an LED screen, an organic LED screen, an e-ink screen with or without backlighting, and/or any combination of multiple types of display hardware.

In some embodiments, transportation key 302 may include one or more NFC systems and/or RFID chips, such as such as NFC chip 308, that enables transportation key 302 to transmit information over short distances. For example, transportation key 302 may transmit payment information and/or transit information to a transportation network (e.g., a public transportation network) when NFC chip 308 is in physical proximity to a payment information receiver associated with the transportation network. In this example, a transmission module may transmit the information relevant to the at least one transportation network (e.g., payment information, transportation-pass information, etc.) to the information receiver associated with the at least one transportation network via near-field communication. In one embodiment, transportation key 302 may unlock MMVs associated with a dynamic transportation network via NFC Chip 308. For example, tapping NFC chip 308 on an NFC reader of a bicycle may unlock the bicycle and/or allocate the bicycle to the transportation requestor associated with transportation key 302.

In some embodiments, transportation key 302 may be capable of being paired with a mobile device, such as a mobile phone (via, e.g., an NFC protocol, a Bluetooth protocol, etc.). For example, transportation key 302 may detect a press of button 304, initiate a transportation request, and then enable or cause detailed information about the transportation request (e.g., provider description, ETA, directions to meet a provider, and other status information) to be displayed on the paired mobile phone. In some embodiments, transportation key 302 may send the information directly via a communication protocol. Additionally or alternatively, transportation key 302 may inform a dynamic transportation matching system that transportation key 302 is paired with a mobile phone, and the dynamic transportation matching system may then send information to the mobile phone.

FIG. 4 illustrates a transportation key 402 with the form factor of a keyfob similar to the type of keyfob used to lock and unlock automobiles. In one embodiment, transportation key 402 may have a button 404 and/or a button 406 that function similarly to buttons 304 and/or 306 described in conjunction with FIG. 3. Additionally or alternatively, transportation key 402 may have a display 410 that displays information related to transportation requests initiated by transportation key 402. In some examples, display 410 may include one or more LEDs that change color (e.g., a particular color may be indicative of a particular provider that may be displaying a light of the same color).

Transportation key 402 may include one or more audio transducers for transmitting and/or receiving audio signals. In some embodiments, transportation key 402 may include a speaker 408 that may provide audio information to a transportation requestor. For example, speaker 408 may provide audio prompts (e.g., "What is your destination?"), confirmations (e.g., "Request received"), and/or directions (e.g., "Turn left at $1^{st}$ Street"). In some embodiments, speaker 408 may emit (in response to, e.g., instructions received from a transportation key controller, such as transportation key controller 520 in FIG. 5) audio information that describes one or more statuses associated with a transportation request, such as, "Matching now," "Match found," "ETA 5 minutes," and/or other relevant information. As shown in FIG. 4, transportation key 402 may also include an audio receiver, such as a microphone 412, that captures or receives audio information, such as the destination of the transportation request, from a transportation requestor.

In some embodiments, transportation key 402 may also include a variety of additional components not shown in FIG. 4. For example, in some embodiments, transportation key 402 may include one or more NFC systems and/or RFID chips for communicating with MMVs, transportation networks, and/or mobile devices. In some embodiments, transportation key 402 may include one or more biometric authentication systems. For example, transportation key 402 may include a fingerprint reader 414. Transportation key 302 may also include a transportation key controller that interfaces with button 304, button 306, NFC chip 308, and/or display 310. The discussion corresponding to FIG. 5 provides addition detail about these and other types of components that may be included in transportation key 402 and/or transportation key 302.

Figure 5:
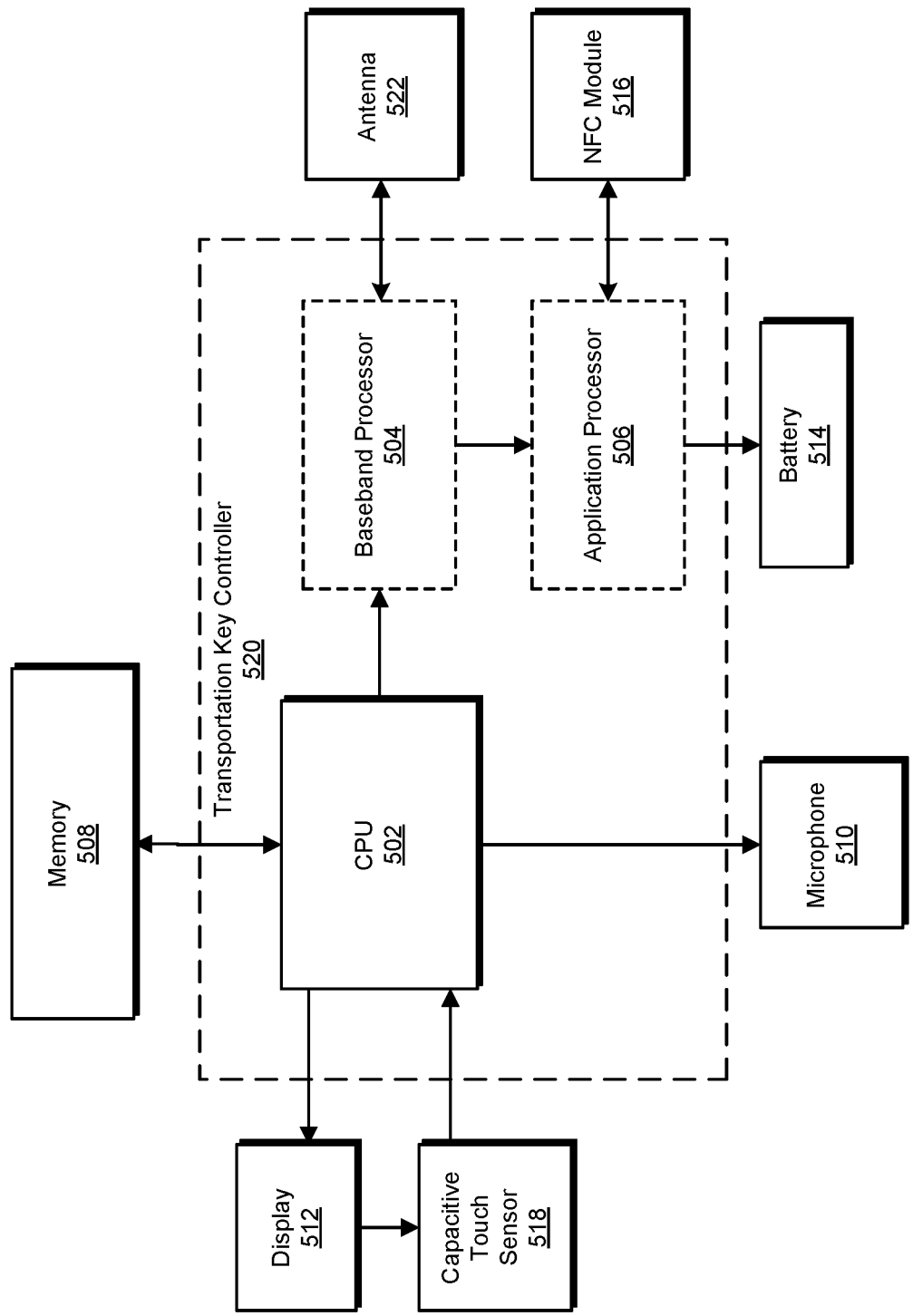
FIG. 5 is a block diagram of an example system for a transportation key.

FIG. 5 illustrates example hardware components of a transportation key. As will be described in greater detail below, the transportation keys described herein may include more components than those illustrated in FIG. 5 and/or more omit one or more of the components illustrated in this figure. In one embodiment, a central processing unit (CPU) 502 may be communicatively coupled to a baseband processor 504, memory 508, microphone 510, and/or a display 512. In one embodiment, CPU 502 may include a clock. In some embodiments, baseband processor 504 may communicate with a transmission tower (e.g., a cell tower) via an antenna 522. In some embodiments, antenna 522 may function as a transmitter and/or receiver that sends and/or receives information to and/or from a dynamic transportation matching system. For example, antenna 522 may transmit a transportation request to a dynamic transportation matching system (such as dynamic transportation matching system 604 in FIG. 6) via a communication network. Similarly, antenna 522 may receive one or more statuses associated with such a transportation request from the dynamic transportation matching system via a communication network.

Additionally or alternatively, the transportation key may be configured with a wi-fi receiver that may send and/or receive information to and/or from a dynamic transportation matching system. The term "transmitter," in some examples, may generally refer to any component capable of sending messages from a device to another device and/or network via one or more communication media (e.g., wi-fi, cellular network, etc.). The term "receiver," in some examples, may generally refer to any component capable of receiving messages sent to a device by another device and/or network via one or more communication media. For example, antenna 522 and/or a wi-fi receiver may receive one or more statuses associated with the transportation request from the dynamic transportation matching system.

In some embodiments, communicating via a wi-fi network rather than via a baseband network may reduce power consumption by the transportation key, improving battery life. Accordingly, in one embodiment, the transportation key may omit baseband processor 504 and/or antenna 522 and/or baseband processor 504 and/or antenna 522 may be entirely replaced by a wi-fi receiver, as shown by the dotted lines used to illustrate these elements. In some embodiments, baseband processor 504 may be communicatively coupled to an application processor 506 that may manage a battery 514 and/or a transmission module such as NFC module 516 and/or an RFID chip. The term "transmission module," in some examples, may generally refer to any physical component that sends and/or receives messages to and/or from devices external to the transportation key.

In some embodiments, battery 514 may be configured for wireless charging and/or may be coupled to hardware that receives an electrical charge wirelessly and provides the electrical charge to battery 514. In addition, memory 508 may store information about various transportation networks, such as transit passes, identification information, and/or payment information. In one embodiment, display 512 may include one or more LEDs that individually or collectively display (or represent) various information. In some embodiments, the transportation key may also include a capacitive touch sensor 518 that detects when display 512 is touched.

In some embodiments, the transportation key may include an authentication component configured to authenticate a transportation requestor associated with the transportation apparatus. The term "authentication component," in some examples, may generally refer to any component capable of verifying the identity of a user via one or more methods. The authentication component may implement any of a variety of authentication measures, including, e.g., a biometric authentication system. In one example, the transportation key may include a fingerprint reader. Additionally or alternatively, the transportation key may include a voice recognition system that may authenticate the transportation requestor via microphone 510.

In some embodiments, CPU 502, baseband processor 504, and/or application processor 506 may form a transportation key controller 520 that controls, receives data from, and/or otherwise interfaces with the other systems of the transportation key. In some embodiments, transportation key controller 520 may perform operations that include initiating a transportation request with a dynamic transportation matching system in response to receiving a signal from a hardware input, generating data on a display (e.g., display 512) to indicate the transportation request is initiated, and/or modifying data on the display to indicate one or more statuses associated with the transportation request. In some examples, the term "operations," as used herein, may generally refer to any computing instruction or set of computing instructions initiated and/or carried out by a component of an apparatus.

In some embodiments, a transportation key may be a purpose-built device that may not perform all of the functions expected of a general-purpose computing device. For example, a transportation key may be constructed and/or configured such that applications cannot be installed on the transportation key. In one embodiment, a transportation key may be constructed and/or configured such that firmware is the only type of software that may be installed on the transportation key. In some embodiments, a transportation key may be configured such that only transportation-related applications (as opposed to, e.g., general-purpose applications, such as a web browser) may be executed on the transportation key. In one embodiment, a transportation key may be constructed with one or more application-specific integrated circuits. In some embodiments, a transportation key may be configured such that only a limited number, limited type, and/or predetermined set of files (e.g., transportation requestor profile information and/or payment information) may be stored in memory on the transportation key. In some embodiments, a transportation key may be configured to only connect to, send messages to, and/or receive messages from specified devices and/or types of devices, such as a transportation matching server, transportation provider vehicles, and/or a transportation requestor device. In some embodiments, a transportation key may be constructed without a baseband processor (instead including, e.g., a wi-fi and/or BLUETOOTH radio).

Figure 6:
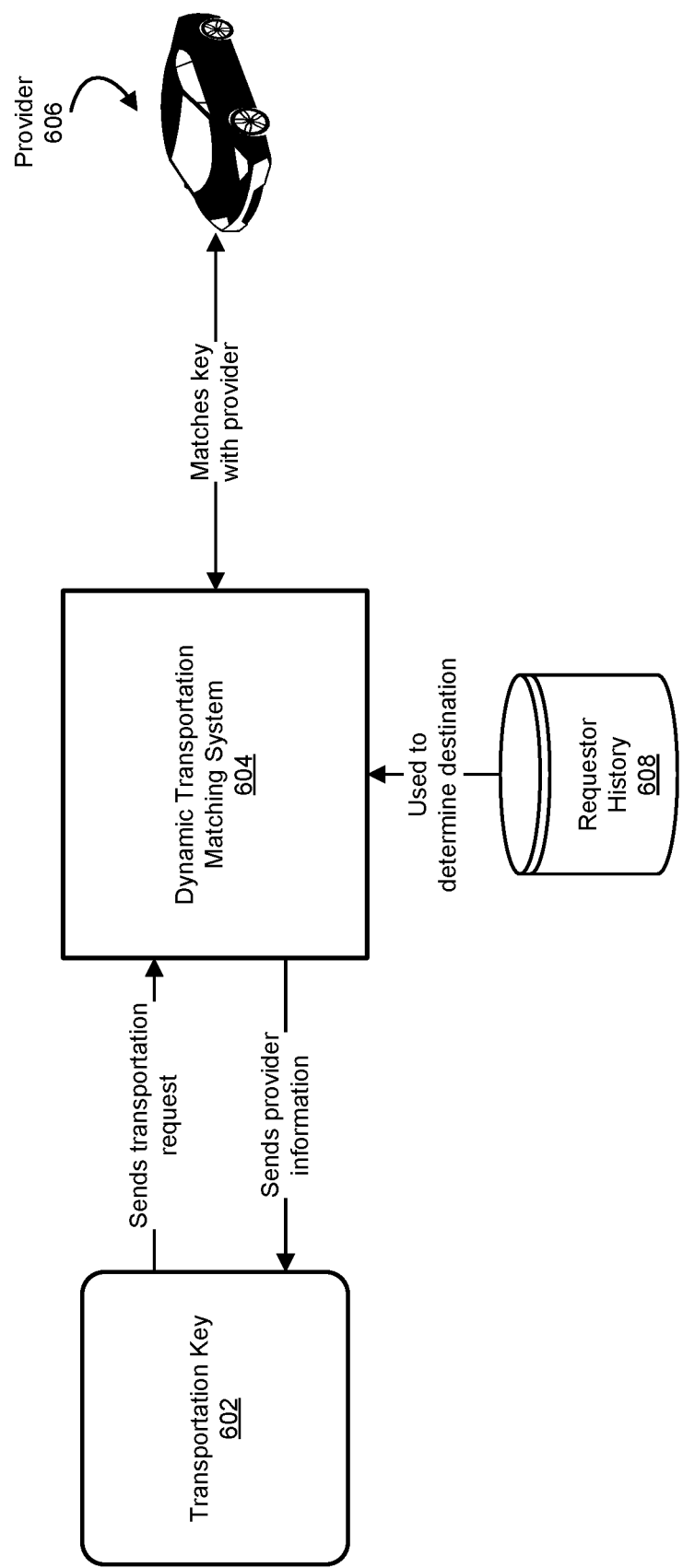
FIG. 6 is a block diagram of a system for requesting transit via a transportation key.

FIG. 6 illustrates a system for requesting transit via a transportation key. In one embodiment, a transportation key 602 may send a transportation request to a dynamic transportation matching system 604 via a communication network. The term "communication network," in some examples, may generally refer to any type of network that conveys messages between two or more devices. In some embodiments, transportation key 602 may send the transportation request via a cellular network. Additionally or alternatively, transportation key 602 may send the request via wi-fi.

In some examples, in response to receiving a transportation request, dynamic transportation matching system 604 may query a requestor history database 608 and/or use information reported by transportation key 602 (e.g., current location) to determine a likely destination of the transportation request. In some examples, dynamic transportation matching system 604 may use time of day, day of week, location of transportation key 602, and/or weather to determine a context of the transportation request in order to predict the likely destination based on the destinations of similar previous requests. The term "context," in some examples, may generally refer to the location, time of day, day of the week, and/or weather associated with a transportation request. For example, if it is currently 5 p.m. on a Tuesday and transportation key 602 is located at the transportation requestor's office, dynamic transportation matching system 604 may predict that the destination is the transportation requestor's home. In another example, if it is currently 7 p.m. on a Friday, dynamic transportation matching system 604 may predict that the destination is a bar frequented by the transportation requestor. In one example, if transportation key 602 is located at a sporting arena and it is a weekend evening, the dynamic transportation matching system 604 may determine that the destination is likely a nearby restaurant. In another example, if transportation key 602 is currently located at the requestor's home and it is 7 a.m. on a weekday, dynamic transportation matching system 604 may determine that the destination is a nearby public transit station. In one example, if transportation key 602 is located at the requestor's home at 7 a.m. on a weekday and it is currently raining, dynamic transportation matching system 604 may instead determine that the destination is the transportation requestor's office rather than the nearby public transit station. In various examples, dynamic transportation matching system 604 may correlate the initiation times of previous transportation requests with the initiation time of the current request. For example, dynamic transportation matching system 604 may correlate requests initiated on previous Fridays with a current request on a Friday. In one example, if a transportation requestor has previously requested transit from their workplace to a nearby pub in multiple requests, each initiated on a different previous Friday, dynamic transportation matching system 604 may determine that a new transportation request initiated on a Friday from the requestor's workplace has an expected destination of the pub. In some examples, dynamic transportation matching system 604 may correlate requests initiated at approximately 8:30 am on previous days with a current request initiated at 8:30 am and/or may correlate requests initiated on "non-working" days (e.g., holidays, weekends, and/or other days off identified in a profile of the transportation requestor) with a current request on a "non-working" day.

In some examples, dynamic transportation matching system 604 may match transportation key 602 with a transportation provider 606 based on the location of transportation key 602, the destination of the transportation request, the location of transportation provider 606, and/or various other factors. In some examples, dynamic transportation matching system 604 may match transportation key 602 with transportation provider 606 based at least in part on a default and/or most commonly selected transportation provider type for the transportation requestor. For example, if the transportation requestor commonly selects shared rides and/or has explicitly selected an option to default to shared rides, dynamic transportation matching system 604 may automatically match transportation key 602 with a shared ride provider in response to a button press without the transportation requestor being required to provider further information (e.g., via selecting options and/or navigating menus) during the transportation request. In another example, if the transportation requestor has an implicit or explicit preference for luxury providers, dynamic transportation matching system 604 may automatically match requests from transportation key 602 with luxury providers. In some examples, dynamic transportation matching system 604 may send information about provider 606, such as ETA and/or an identifier, to transportation key 602.

Figure 7:
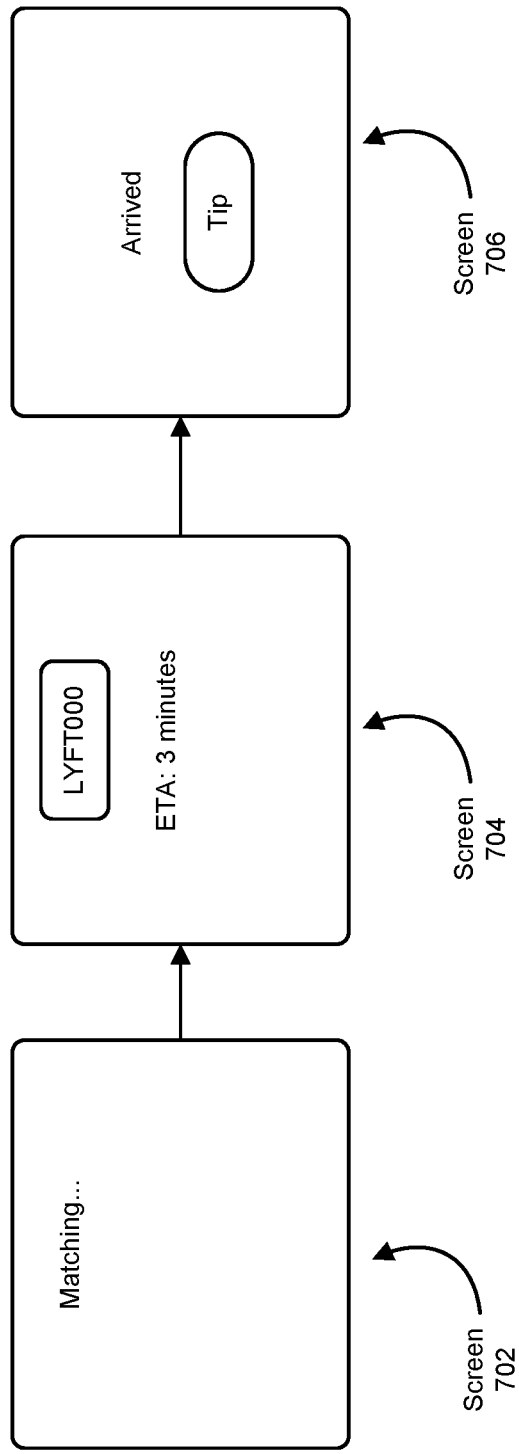
FIG. 7 is an illustration of an example display progression for a transportation key.

FIG. 7 illustrates an example display progression for the display of a transportation key. As illustrated in FIG. 7, after a transportation request has been initiated, a screen 702 may display a status message such as "Matching . . . ." Once the transportation key has been matched with a transportation provider, a screen 704 may display information about the provider, such as ETA and/or license plate. In some embodiments, screen 704 may display directions for where to meet the provider and/or additional provider information, such as type of vehicle and/or name of driver. In one embodiment, screen 704 may include a colored portion that matches a color displayed by the transportation provider (e.g., via an LED-equipped device in the provider's windshield). In some examples, after the transportation request has been fulfilled and the transportation request has arrived at the destination (e.g., as determined by a location service of the provider and/or transportation key), a screen 706 may display a message such as "arrived" and/or an option to tip the transportation provider. In some embodiments, the display may include a capacitive touch sensor that enables the transportation key to detect when and/or where the transportation requestor has touched the screen. In some examples, pressing "tip" on the display may send a preset percentage of the price of fulfilling the transportation request as a tip. Additionally or alternatively, pressing "tip" on the display may give the transportation requestor the option to specify tip amount, for example by one or more buttons and/or using voice commands. In one embodiment, rolling a car wheel on a key with the form factor of a car may enable a user to specify the amount of a tip (e.g., by rolling the wheel forward to increase the tip and backwards to decrease the tip). In some embodiments, the display may display prompts in addition to and/or in place of information. For example, in response to detecting a button press, the display may display the query, "Are you going home? Yes/No." In one example, the transportation key may detect the requestor's response via the capacitive touch sensor.

Figure 8:
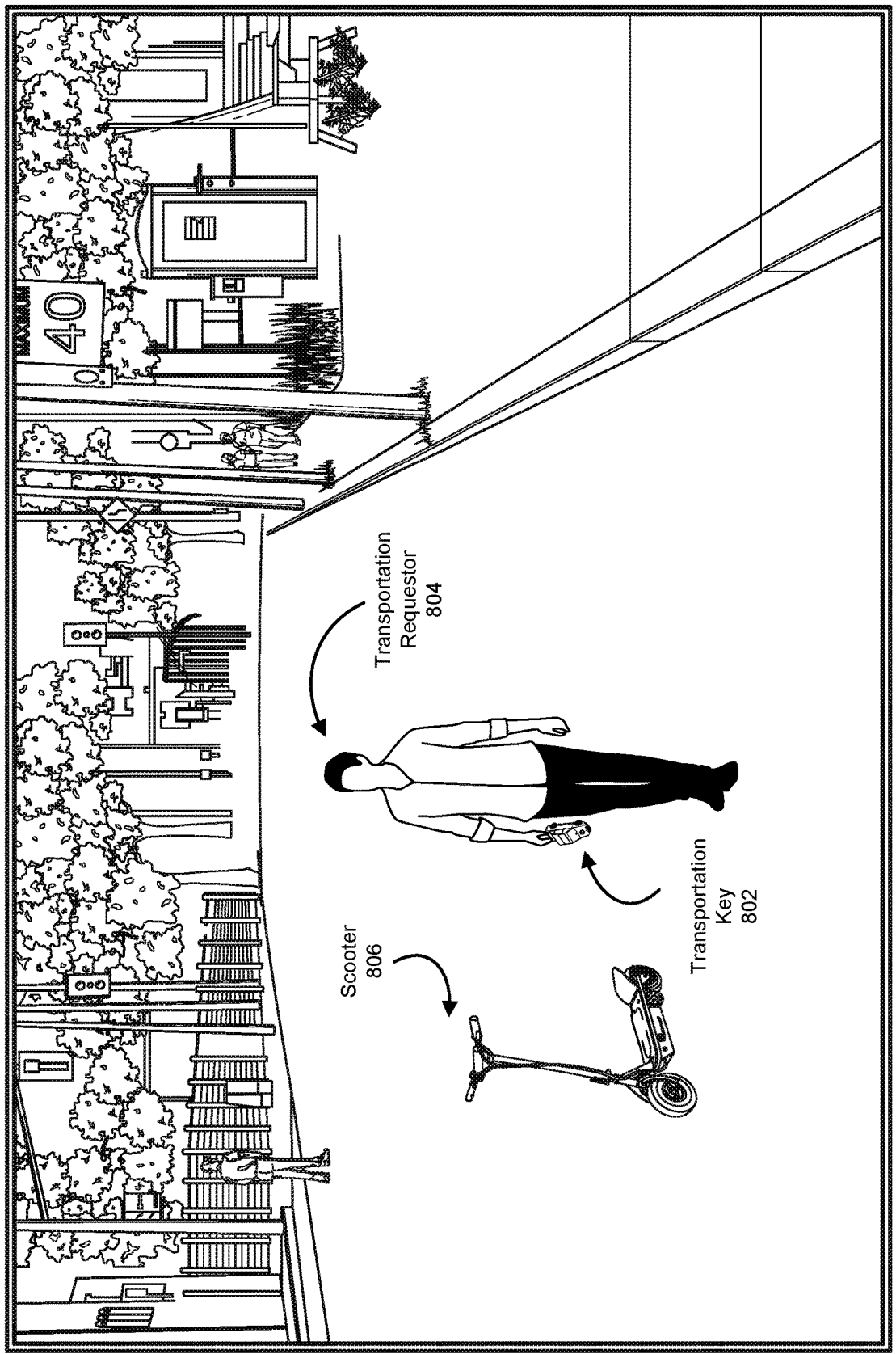
FIG. 8 is an illustration of an example transportation key unlocking a scooter.

FIG. 8 illustrates an example transportation key in context. In one example, a transportation requestor 804 may approach a scooter 806 that is managed by a dynamic transportation matching system. In one example, transportation requestor 804 may have been matched with scooter 806 by the dynamic transportation matching system. In other examples, transportation requestor 804 may not have initiated a transportation request to the dynamic transportation matching system but may have encountered scooter 806 and decided to use scooter 806 for transportation. In some embodiments, transportation requestor 804 may touch a transportation key 802 to scooter 806 in order to physically unlock scooter 806 and/or in order to be allocated scooter 806 by the dynamic transportation matching system. In one embodiment, transportation requestor 804 may touch a specific part of transportation key 802 (e.g., an RFID chip) to a specific part of scooter 806 (e.g., an RFID reader and/or scanner) and/or a specific part of a dock in which scooter 806 is docked. In some examples, scooter 806 may unlock in response to a scan of transportation key 802.

The term "scan," in some examples, may generally refer to any interaction between two modules of separate devices that are capable of communicating over short distances. In some embodiments, a scan may involve visual communication, such as a QR code and/or barcode. Additionally or alternatively, a scan may involve radio communication, such as an RFID tag. In one embodiment, transportation requestor 804 may bring transportation key 802 within several inches of a scanner on scooter 806 to enable the scanner on scooter 806 to scan transportation key 802. Additionally or alternatively, transportation requestor 804 may bring transportation key 802 into physical proximity (e.g., with one foot) of scooter 806 and scooter 806 may detect transportation key 802 and/or may unlock in response to the physical proximity of transportation key 802. In some embodiments, the dynamic transportation matching system may later deallocate scooter 806 from transportation requestor 804 and/or lock scooter 806 in response to detecting that transportation key 802 and scooter 806 are no longer in proximity. By using transportation key 802 to unlock scooter 806 via touch and/or proximity, transportation requestor 804 may interact with scooter 806 conveniently without being required to open an application, enter a code, and/or carry an additional physical object that provides transit and/or payment information. In some embodiments, unlocking scooter 806 and/or a different type of MMV via transportation key 802 may automatically cancel an in-progress transportation request initiated by transportation key 802. For example, transportation requestor 804 may request transportation by pressing a button on transportation key 802, notice scooter 806 and decide to take scooter 806 instead of waiting for a transportation provider, and unlock scooter 806 with transportation key 802. In this example, transportation key 802 may cancel the transportation request in response to scooter 806 being unlocked without receiving an additional signal (e.g., a button press) from transportation requestor 804. Although illustrated in FIG. 8 as an electric scooter, scooter 806 may represent any type of MMV including but not limited to electric and/or manual scooters and/or bicycles. In some embodiments, transportation key 802 may be capable of detecting the nearest MMV that is associated with the dynamic transportation network. For example, transportation key 802 may detect that a user has pressed a button dedicated to locating an MMV and may display the location of the MMV on the display and/or use the speaker to describe the location of the MMV (e.g., "the corner of $4^{th}$ and King St"). In some embodiments, if transportation key 802 is within a predetermined distance of an MMV (e.g., 100 meters) or within a predetermined travel time (e.g., two minutes), transportation key 802 may inform the dynamic transportation matching system to allocate the MMV to the user to ensure that the MMV is still available when the user arrives.

Figure 9:
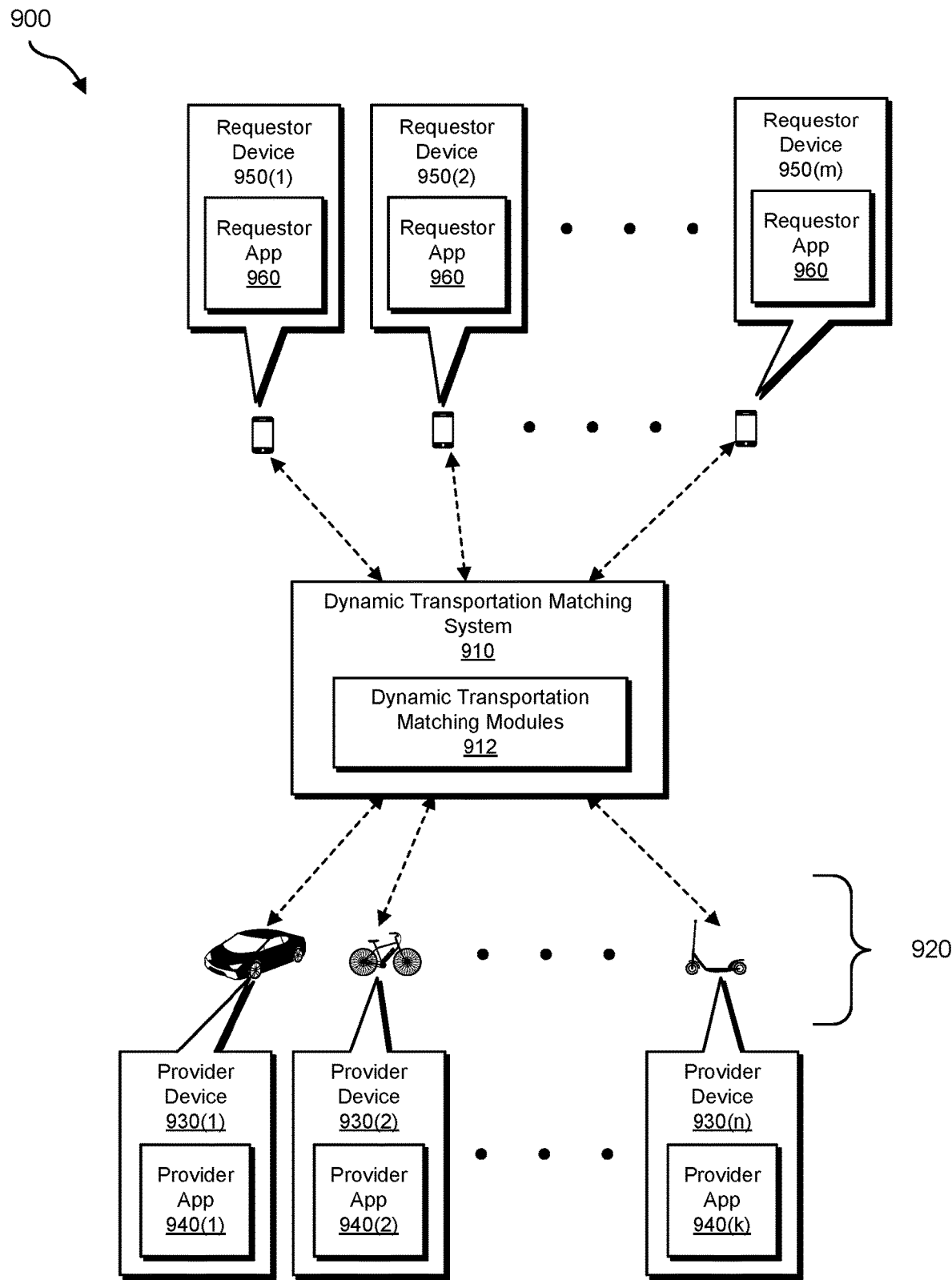
FIG. 9 is a block diagram of an example system for dynamic transportation matching.

FIG. 9 illustrates an example system 900 for matching transportation requests with a dynamic transportation network that includes personal mobility vehicles. As shown in FIG. 9, a dynamic transportation matching system 910 may be configured with one or more dynamic transportation matching modules 912 that may perform one or more of the steps described herein. Dynamic transportation matching system 910 may represent any computing system and/or set of computing systems capable of matching transportation requests. Dynamic transportation matching system 910 may be in communication with computing devices in each of a group of vehicles 920. Vehicles 920 may represent any vehicles that may fulfill transportation requests. In some examples, vehicles 920 may include disparate vehicle types and/or models. For example, vehicles 920 may include road-going vehicles and personal mobility vehicles. In some examples, some of vehicles 920 may be standard commercially available vehicles. According to some examples, some of vehicles 920 may be owned by separate individuals (e.g., transportation providers). Furthermore, while, in some examples, many or all of vehicles 920 may be human-operated, in some examples many of vehicles 920 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 9 does not specify the number of vehicles 920, it may be readily appreciated that the systems described herein are applicable to hundreds of vehicles, thousands of vehicles, or more. In one example, dynamic transportation matching system 910 may coordinate transportation matchings within a single region for 50,000 vehicles or more on a given day. In some examples, vehicles 920 may collectively form a dynamic transportation network that may provide transportation supply on an on-demand basis to transportation requestors.

As mentioned above, dynamic transportation matching system 910 may communicate with computing devices in each of vehicles 920. The computing devices may be any suitable type of computing device. In some examples, one or more of the computing devices may be integrated into the respective vehicles 920. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 910.

As shown in FIG. 9, vehicles 920 may include provider devices 930(1)-(n) (e.g., whether integrated into the vehicle, permanently affixed to the vehicle, temporarily affixed to the vehicle, worn by a driver of the vehicle, etc.). In some examples, provider devices 930 may include provider applications 940(1)-(k). Provider applications 940(1)-(k) may represent any application, program, and/or module that may provide one or more services related to operating a vehicle and/or providing transportation matching services. For example, provider applications 940(1)-(k) may include a transportation matching application for providers and/or one or more applications for matching personal mobility vehicles (PMVs) with requestor devices. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider applications 940(1)-(k) may match the user of provider applications 940(1)-(k) (e.g., a transportation provider) with transportation requestors through communication with dynamic transportation matching system 910. In addition, and as is described in greater detail below, provider applications 940(1)-(k) may provide dynamic transportation management system 910 with information about a provider (including, e.g., the current location of the provider and/or vehicle) to enable dynamic transportation management system 910 to provide dynamic transportation matching and/or management services for the provider and one or more requestors. In some examples, provider applications 940(1)-(k) may coordinate communications and/or a payment between a requestor and a provider. According to some embodiments, provider applications 940(1)-(k) may include a map service, a navigation service, a traffic notification service, and/or a geolocation service.

Additionally, as shown in FIG. 9, dynamic transportation matching system 910 may communicate with requestor devices 950(1)-(m). In some examples, requestor devices 950 may include a requestor app 960. Requestor app 960 may represent any application, program, and/or module that may provide one or more services related to requesting transportation matching services. For example, requestor app 960 may include a transportation matching application for requestors. In some examples, requestor app 960 may match the user of requestor app 960 (e.g., a transportation requestor) with transportation providers through communication with dynamic transportation matching system 910. In addition, and as is described in greater detail below, requestor app 960 may provide dynamic transportation management system 910 with information about a requestor (including, e.g., the current location of the requestor) to enable dynamic transportation management system 910 to provide dynamic transportation matching services for the requestor and one or more providers. In some examples, requestor app 960 may coordinate communications and/or a payment between a requestor and a provider. According to some embodiments, requestor app 960 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service requestors for any service.

Figure 10:
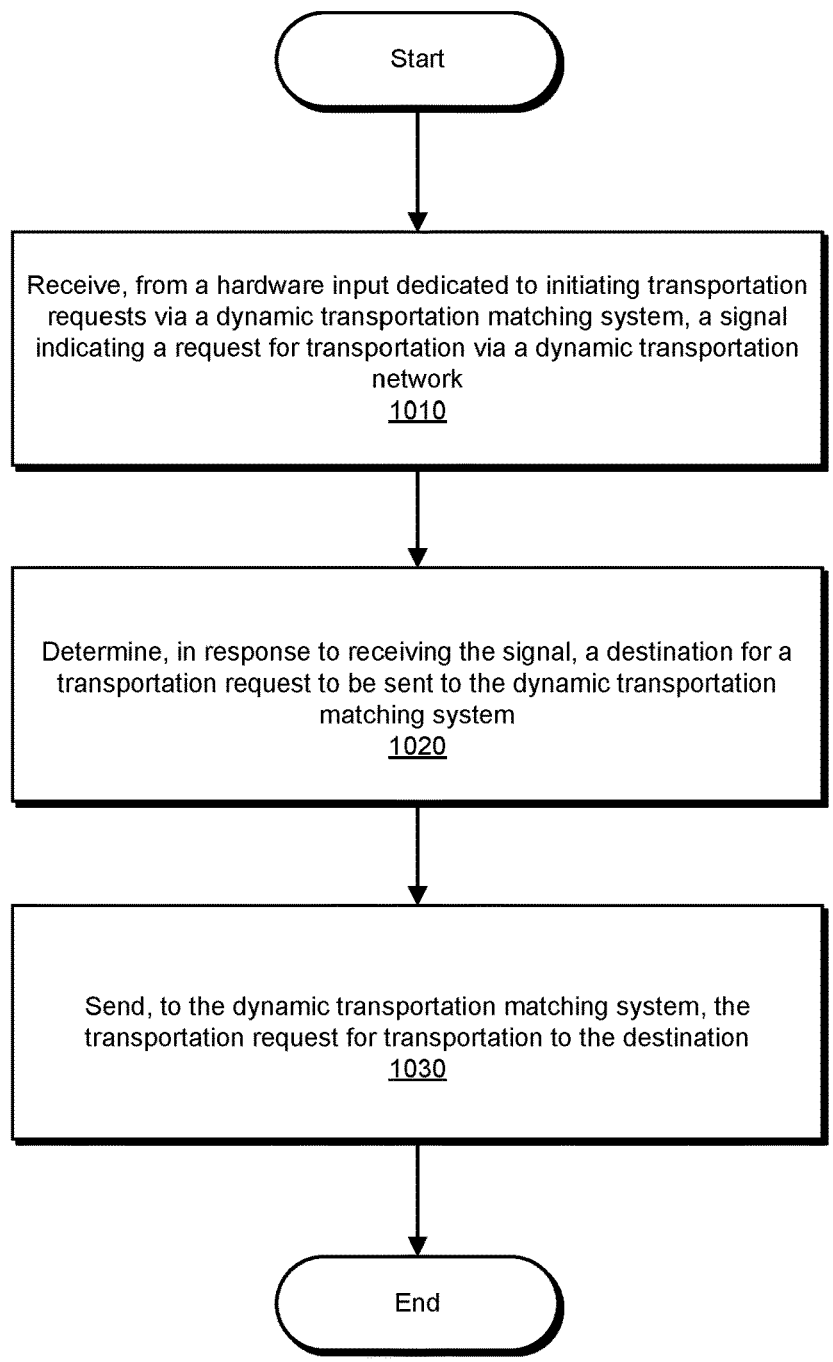
FIG. 10 is a flow diagram of an example method for requesting transportation via a transportation key.

FIG. 10 illustrates an example method 1000 for requesting transportation via a transportation key. As shown in FIG. 10, at step 1010 the systems described herein may receive, from a hardware input dedicated to initiating transportation requests via a dynamic transportation matching system, a signal indicating a request for transportation via a dynamic transportation network.

At step 1020, the systems described herein may determine, in response to receiving the signal, a destination for a transportation request to be sent to the dynamic transportation matching system. In some embodiments, the systems described herein may determine the destination by activating an audio receiver, capturing or receiving audio input from the transportation requestor via the audio receiver, and processing or using the audio input to identify the destination. Additionally or alternatively, the systems described herein may determine the destination by identifying a context of the transportation request based on at least one of a location of a transportation apparatus associated with the transportation requestor and a time that the transportation request was initiated and determining, based on a destination of at least one previous transportation request initiated by the transportation requestor in the context, the destination for the transportation request. At step 1030, the systems described herein may send, to the dynamic transportation matching system, the transportation request for transportation to the destination. The systems described herein may send the transportation request in any suitable manner or context. For example, the systems describe herein may send the transportation request as described in connection with FIG. 6.

Figure 11:
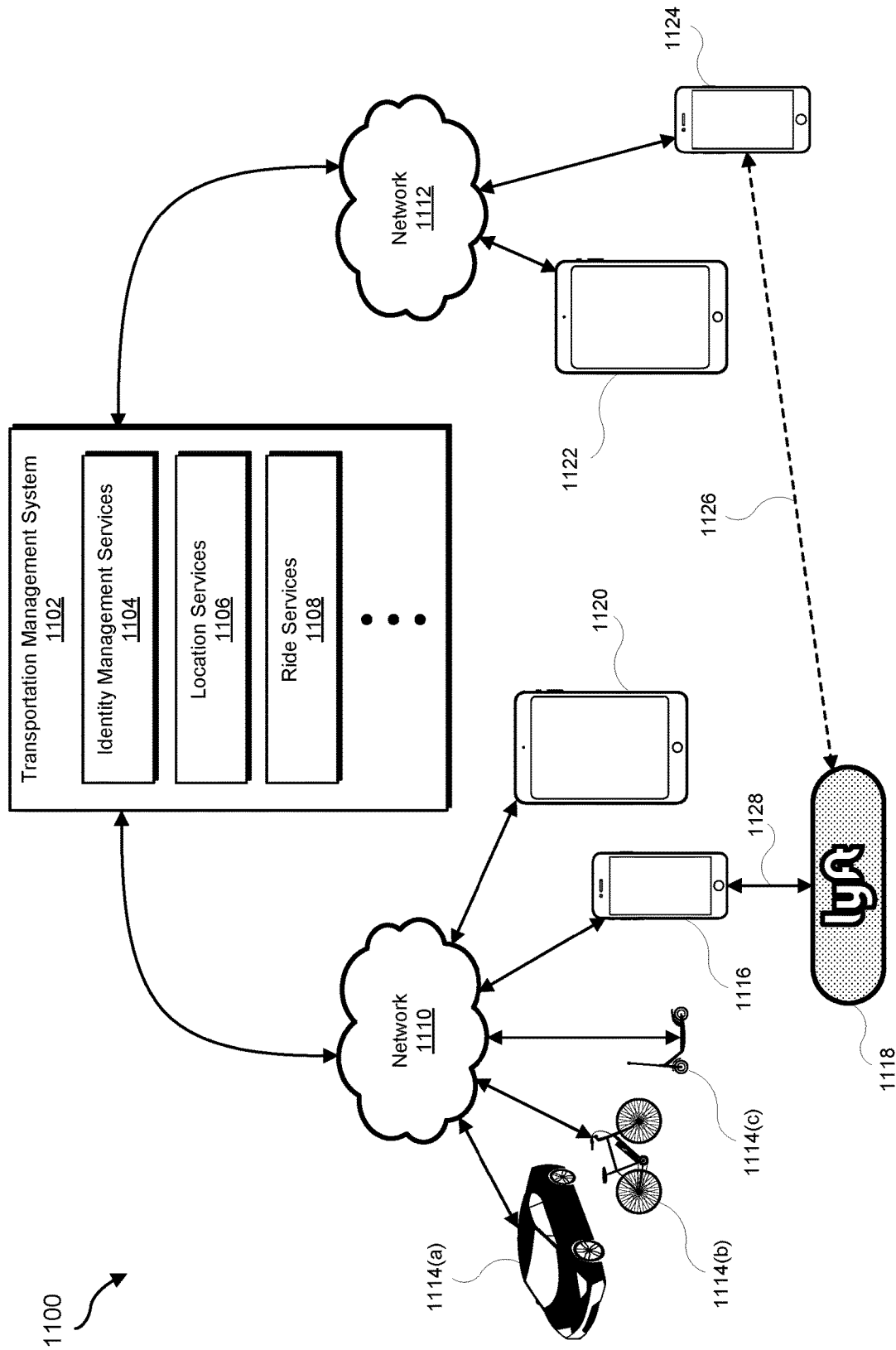
FIG. 11 is an illustration of an example requestor/provider management environment.

FIG. 11 shows a transportation management environment 1100, in accordance with various embodiments. As shown in FIG. 11, a transportation management system 1102 may run one or more services and/or software applications, including identity management services 1104, location services 1106, ride services 1108, and/or other services. Although FIG. 11 shows a certain number of services provided by transportation management system 1102, more or fewer services may be provided in various implementations. In addition, although FIG. 11 shows these services as being provided by transportation management system 1102, all or a portion of any of the services may be processed in a distributed fashion. For example, computations associated with a service task may be performed by a combination of transportation management system 1102 (including any number of servers, databases, etc.), one or more devices associated with a provider (e.g., devices integrated with managed vehicles 1114(*a*), 1114(*b*), and/or 1114(*c*); provider computing devices 1116 and tablets 1120; and transportation management vehicle devices 1118), and/or more or more devices associated with a ride requestor (e.g., the requestor's computing devices 1124 and tablets 1122). In some embodiments, transportation management system 1102 may include one or more general purpose computers, server computers, clustered computing systems, cloud-based computing systems, and/or any other computing systems or arrangements of computing systems. Transportation management system 1102 may be configured to run any or all of the services and/or software components described herein. In some embodiments, the transportation management system 1102 may include an appropriate operating system and/or various server applications, such as web servers capable of handling hypertext transport protocol (HTTP) requests, file transfer protocol (FTP) servers, database servers, etc.

In some embodiments, identity management services 1104 may be configured to perform authorization services for requestors and providers and/or manage their interactions and/or data with transportation management system 1102. This may include, e.g., authenticating the identity of providers and determining that they are authorized to provide services through transportation management system 1102. Similarly, requestors' identities may be authenticated to determine whether they are authorized to receive the requested services through transportation management system 1102. Identity management services 1104 may also manage and/or control access to provider and/or requestor data maintained by transportation management system 1102, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1102 may also manage and/or control access to provider and/or requestor data stored with and/or obtained from third-party systems. For example, a requester or provider may grant transportation management system 1102 access to a third-party email, calendar, or task management system (e.g., via the user's credentials). As another example, a requestor or provider may grant, through a mobile device (e.g., 1116, 1120, 1122, or 1124), a transportation application associated with transportation management system 1102 access to data provided by other applications installed on the mobile device. In some examples, such data may be processed on the client and/or uploaded to transportation management system 1102 for processing.

In some embodiments, transportation management system 1102 may provide ride services 1108, which may include ride matching and/or management services to connect a requestor to a provider. For example, after identity management services 1104 has authenticated the identity a ride requestor, ride services 1108 may attempt to match the requestor with one or more ride providers. In some embodiments, ride services 1108 may identify an appropriate provider using location data obtained from location services 1106. Ride services 1108 may use the location data to identify providers who are geographically close to the requestor (e.g., within a certain threshold distance or travel time) and/or who are otherwise a good match with the requestor. Ride services 1108 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services 1108 may use rule-based algorithms and/or machine-learning models for matching requestors and providers.

Transportation management system 1102 may communicatively connect to various devices through networks 1110 and/or 1112. Networks 1110 and 1112 may include any combination of interconnected networks configured to send and/or receive data communications using various communication protocols and transmission technologies. In some embodiments, networks 1110 and/or 1112 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1110 and/or 1112 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 902.12 family of standards, Bluetooth, Bluetooth Low Energy, NFC, Z-Wave, and ZigBee). In various embodiments, networks 1110 and/or 1112 may include any combination of networks described herein or any other type of network capable of facilitating communication across networks 1110 and/or 1112.

In some embodiments, transportation management vehicle device 1118 may include a provider communication device configured to communicate with users, such as drivers, passengers, pedestrians, and/or other users. In some embodiments, transportation management vehicle device 1118 may communicate directly with transportation management system 1102 or through another provider computing device, such as provider computing device 1116. In some embodiments, a requestor computing device (e.g., device 1124) may communicate via a connection 1126 directly with transportation management vehicle device 1118 via a communication channel and/or connection, such as a peer-to-peer connection, Bluetooth connection, NFC connection, ad hoc wireless network, and/or any other communication channel or connection. Although FIG. 11 shows particular devices communicating with transportation management system 1102 over networks 1110 and 1112, in various embodiments, transportation management system 1102 may expose an interface, such as an application programming interface (API) or service provider interface (SPI) to enable various third parties which may serve as an intermediary between end users and transportation management system 1102.

In some embodiments, devices within a vehicle may be interconnected. For example, any combination of the following may be communicatively connected: vehicle 1114, provider computing device 1116, provider tablets 1120, transportation management vehicle device 1118, requestor computing device 1124, requestor tablet 1122, and any other device (e.g., smart watch, smart tags, etc.). For example, transportation management vehicle device 1118 may be communicatively connected to provider computing device 1116 and/or requestor computing device 1124. Transportation management vehicle device 1118 may establish communicative connections, such as connections 1126 and 1128, to those devices via any suitable communication technology, including, e.g., WLAN technologies implementing the IEEE 902.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1102 using applications executing on their respective computing devices (e.g., 1116, 1118, 1120, and/or a computing device integrated within vehicle 1114), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1114 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1102. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 12:
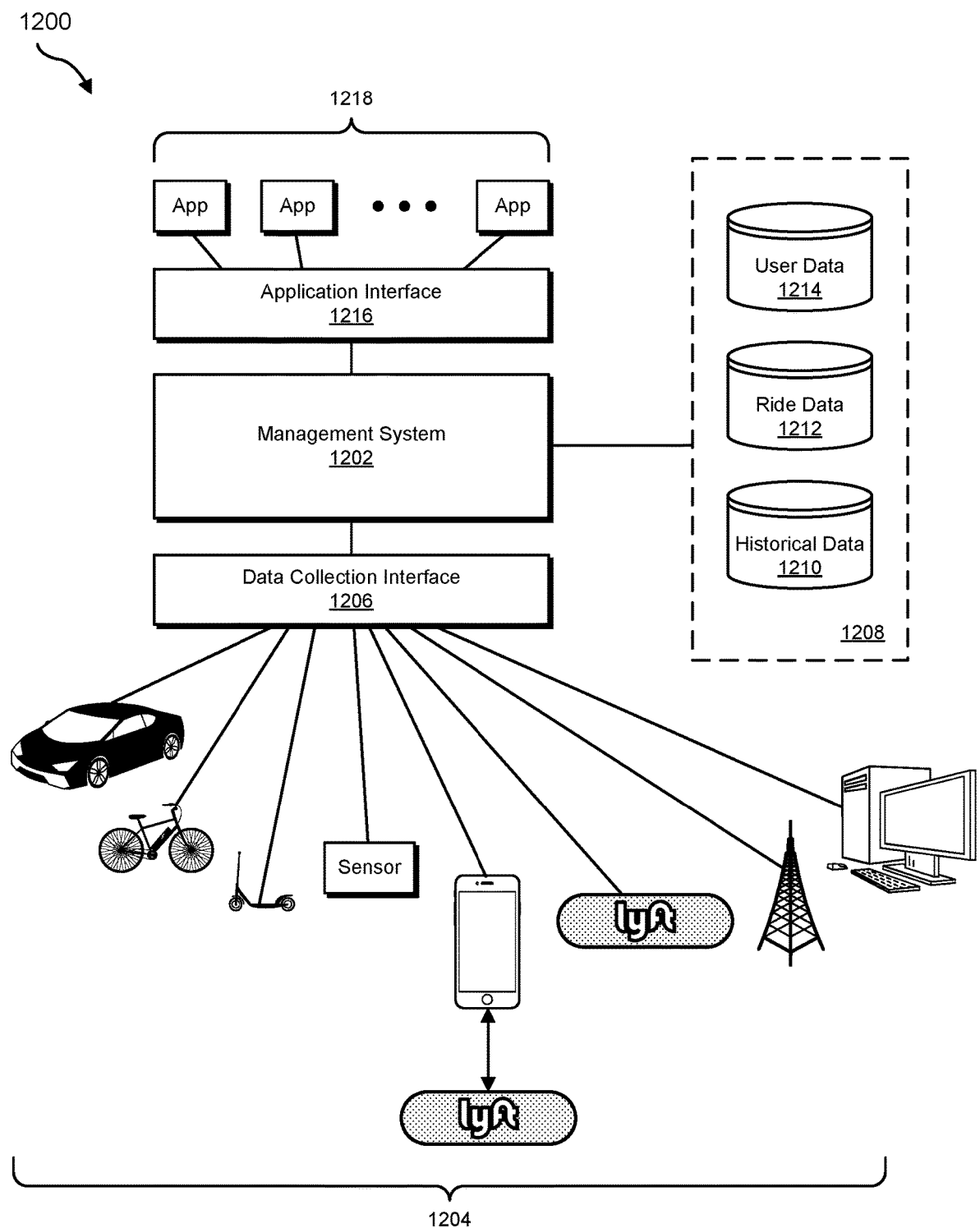
FIG. 12 is an illustration of an example data collection and application management system.

FIG. 12 shows a data collection and application management environment 1200, in accordance with various embodiments. As shown in FIG. 12, management system 1202 may be configured to collect data from various data collection devices 1204 through a data collection interface 1206. As discussed above, management system 1202 may include one or more computers and/or servers or any combination thereof. Data collection devices 1204 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1206 can include, e.g., an extensible device framework configured to support interfaces for each data collection device. In various embodiments, data collection interface 1206 may be extended to support new data collection devices as they are released and/or to update existing interfaces to support changes to existing data collection devices. In various embodiments, data collection devices may communicate with data collection interface 1206 over one or more networks. The networks may include any network or communication protocol as would be recognized by one of ordinary skill in the art, including those networks discussed above.

As shown in FIG. 12, data received from data collection devices 1204 can be stored in data store 1208. Data store 1208 may include one or more data stores, such as databases, object storage systems and services, cloud-based storage services, and other data stores. For example, various data stores may be implemented on a non-transitory storage medium accessible to management system 1202, such as historical data 1210, ride data 1212, and user data 1214. Data stores 1208 can be local to management system 1202, or remote and accessible over a network, such as those networks discussed above or a storage-area network or other networked storage system. In various embodiments, historical data from data 1210 may include historical traffic data, weather data, request data, road condition data, or any other data for a given region or regions received from various data collection devices. Ride data 1212 may include route data, request data, timing data, and other ride related data, in aggregate and/or by requestor or provider. User data 1214 may include user account data, preferences, location history, and other user-specific data. Although certain data stores are shown by way of example, any data collected and/or stored according to the various embodiments described herein may be stored in data stores 1208.

As shown in FIG. 12, an application interface 1216 can be provided by management system 1202 to enable various apps 1218 to access data and/or services available through management system 1202. Apps 1218 may run on various user devices (including provider and requestor computing devices, such as those discussed above) and/or may include cloud-based or other distributed apps configured to run across various devices (e.g., computers, servers, or combinations thereof). Apps 1218 may include, e.g., aggregation and/or reporting apps which may utilize data from data store 1208 to provide various services (e.g., third-party ride request and management apps). In various embodiments, application interface 1216 can include an API and/or SPI enabling third party development of apps 1218. In some embodiments, application interface 1216 may include a web interface, enabling web-based access to data from data store 1208 and/or services provided by management system 1202. In various embodiments, apps 1218 may run on devices configured to communicate with application interface 1216 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A transportation apparatus comprising:
   a hardware input comprising a capacitive touch sensor;
   a touchscreen display; and
   a transportation key controller configured to perform operations comprising:

in response to receiving a user input signal associated with the hardware input, predicting a transportation destination and displaying a query associated with the transportation destination on the touchscreen display;

based on receiving a user response to the query via the touchscreen display, selecting a transportation mode from a plurality of transportation mode types comprising lane-bound vehicles and micro-mobility vehicles;

initiating a transportation request to the transportation destination for the transportation mode via a dynamic transportation matching system;

generating data on the touchscreen display to indicate the transportation request is initiated;

modifying the data on the touchscreen display to indicate one or more statuses associated with the transportation request;

communicatively pairing with a mobile device;

communicatively pairing with a transportation vehicle computing device of the selected transportation mode; and causing, via communicatively pairing the transportation apparatus with the mobile device and the transportation vehicle computing device, the mobile device and the transportation vehicle computing device to display information describing the transportation request initiated via the transportation apparatus.

2. The transportation apparatus of claim 1, wherein the transportation key controller is further configured to perform operations comprising in response to receiving an alternate user input signal associated with the hardware input, providing a panic indication by transmitting a location of the transportation key controller to a third party.

3. The transportation apparatus of claim 1, wherein predicting the transportation destination comprises predicting the transportation destination based on a location of the transportation key controller.

4. The transportation apparatus of claim 1, wherein the transportation apparatus comprises a receiver that receives the one or more statuses associated with the transportation request from the dynamic transportation matching system via a communication network.

5. The transportation apparatus of claim 1, wherein the transportation apparatus further comprises an arrangement of lights and wherein the transportation key controller is further configured to perform operations comprising, in response to identifying a direction between the transportation key controller and a provider device selected for the transportation request, lighting up the arrangement of lights to indicate the direction to the provider device selected for the transportation request.

6. The transportation apparatus of claim 1, wherein the transportation key controller is further configured to perform operations comprising:

storing payment information for at least one transportation network associated with the selected transportation mode; and providing the payment information to the at least one transportation network.

7. The transportation apparatus of claim 1, further comprising an audio receiver that captures audio information to relay to the transportation key controller.

8. The transportation apparatus of claim 7, wherein the transportation key controller is configured to perform operations comprising using the audio information to identify a destination of the transportation request.

9. The transportation apparatus of claim 6, further comprising a payment information module that is configured to perform operations comprising:

storing payment information for at least one transportation network that provides transportation resources to the dynamic transportation matching system; and providing the payment information to the at least one transportation network in response to detecting physical proximity to a payment information receiver for the at least one transportation network.

10. The transportation apparatus of claim 1, wherein the transportation key controller is further configured to perform operations comprising initiating the transportation request by allocating a vehicle based on detecting the transportation key controller enters a proximity of the vehicle.

11. The transportation apparatus of claim 10, wherein the transportation key controller is further configured to perform operations comprising cancelling the transportation request by deallocating the vehicle based on detecting the transportation key controller leaving the proximity of the vehicle.

12. The transportation apparatus of claim 1, further comprising an authentication component that authenticates a transportation requester associated with the transportation apparatus, wherein the authentication component comprises a biometric authentication system.

13. The transportation apparatus of claim 1, wherein the transportation apparatus is configured to unlock a transportation provider vehicle matched with the transportation apparatus by the dynamic transportation matching system, wherein the transportation provider vehicle is unlocked at least in part in response to detecting physical proximity of the transportation apparatus.

14. The transportation apparatus of claim 1, further comprising an additional hardware input dedicated to initiating a message to the dynamic transportation matching system that cancels the transportation request initiated by the transportation apparatus.

15. The transportation apparatus of claim 1, wherein the one or more statuses associated with the transportation request comprise an identifier of a transportation provider matched with the transportation apparatus by the dynamic transportation matching system.

16. The transportation apparatus of claim 1, wherein the hardware input comprises a dial, and rolling the dial modifies a configuration value for the selected transportation mode.

17. A system comprising:
a touchscreen display;
a transportation key controller configured to perform operations comprising:

in response to receiving a user input signal, predicting a transportation destination and displaying a query associated with the transportation destination on the touchscreen display;

based on receiving a user response to the query via the touchscreen display, selecting a transportation mode from a plurality of transportation mode types comprising lane-bound vehicles and micro-mobility vehicles;

initiating a transportation request to the transportation destination for the transportation mode via a dynamic transportation matching system;

generating data on the touchscreen display to indicate the transportation request has been initiated;

modifying the data on the touchscreen display to indicate one or more statuses associated with the transportation request;

communicatively pairing with a mobile device;
communicatively pairing with a transportation vehicle computing device of the selected transportation mode; and
causing, via communicatively pairing the transportation key controller with the mobile device and the transportation vehicle computing device, the mobile device and the transportation vehicle computing device to display information describing the transportation request initiated via the transportation key controller;
a hardware input dedicated to sending the user input signal to the transportation key controller;
a memory that stores information relevant to at least one transportation network; and
a transmission module that transmits the information relevant to the at least one transportation network to an information receiver associated with the at least one transportation network via near-field communication.

18. A method comprising:
receiving, from a hardware input comprising a touchscreen display utilizing a capacitive touch sensor dedicated to initiating transportation requests via a dynamic transportation matching system, a signal indicating a request for transportation via a dynamic transportation network;
determining, in response to receiving the signal, a destination for a transportation request that is to be sent to the dynamic transportation matching system, predicting a transportation destination and displaying a query associated with the transportation destination on the touchscreen display;
based on receiving a user response to the query via the touchscreen display, selecting a transportation mode from a plurality of transportation mode types comprising lane-bound vehicles and micro-mobility vehicles;
sending, to the dynamic transportation matching system, the transportation request for transportation to the transportation destination via the transportation mode to the destination;
communicatively pairing with a mobile device;
communicatively pairing with a transportation vehicle computing device of the selected transportation mode; and
causing the mobile device and the transportation vehicle computing device to display information describing the transportation request initiated via the hardware input.

19. The method of claim 18, wherein determining the destination for the transportation request comprises:
activating an audio receiver;
capturing audio input via the audio receiver; and
processing the audio input to determine the destination.

20. The method of claim 18, wherein determining the destination for the transportation request comprises:
identifying at least one of:
a location of a transportation apparatus associated with a transportation requestor; and
an initiation time of an initiation of the transportation request;
retrieving a destination of at least one previous transportation request initiated via the transportation apparatus at least one of the location and a time correlated with the initiation time; and
setting the destination for the transportation request to the destination of the at least one previous transportation request.

* * * * *